(12) United States Patent
Burgard et al.

(10) Patent No.: US 8,791,191 B2
(45) Date of Patent: Jul. 29, 2014

(54) ZINC OXIDE PARTICLES WHICH HAVE BEEN MODIFIED WITH PHOSPHONOCARBOXYLIC ACID AND USE OF ZINC OXIDE PARTICLES

(75) Inventors: Detlef Burgard, Voelklingen (DE); Marc Herold, Saarbruecken (DE); Klaus Steingroever, Saarbruecken (DE)

(73) Assignee: Buehler Partec GmbH, Saarbruecken (DE)

( * ) Notice: Subject to any disclaimer, the term of this patent is extended or adjusted under 35 U.S.C. 154(b) by 441 days.

(21) Appl. No.: 13/145,012

(22) PCT Filed: Feb. 2, 2010

(86) PCT No.: PCT/EP2010/051248
§ 371 (c)(1),
(2), (4) Date: Sep. 21, 2011

(87) PCT Pub. No.: WO2010/089295
PCT Pub. Date: Aug. 12, 2010

(65) Prior Publication Data
US 2012/0004356 A1    Jan. 5, 2012

(30) Foreign Application Priority Data

Feb. 3, 2009 (EP) .................................... 09151977
Apr. 17, 2009 (EP) .................................... 09158187

(51) Int. Cl.
*C08K 3/22* (2006.01)

(52) U.S. Cl.
USPC ............. 524/432; 556/19; 977/902; 977/773; 977/892

(58) Field of Classification Search
USPC ............. 524/432; 556/19; 977/902, 773, 892
See application file for complete search history.

(56) References Cited

U.S. PATENT DOCUMENTS

| | | | |
|---|---|---|---|
| 4,186,028 A * | 1/1980 | Woditsch et al. | ............. 106/447 |
| 6,083,308 A | 7/2000 | Fletcher | |
| 6,342,556 B1 | 1/2002 | Batdorf et al. | |
| 7,148,277 B2 * | 12/2006 | Grabowski et al. | ........... 524/273 |
| 7,348,029 B2 | 3/2008 | Kliss et al. | |
| 7,438,836 B2 | 10/2008 | Michael et al. | |
| 7,482,054 B2 | 1/2009 | Tarng et al. | |
| 7,642,309 B2 | 1/2010 | Tarng et al. | |
| 7,727,323 B2 | 6/2010 | Tarng et al. | |
| 7,989,504 B2 | 8/2011 | Adam et al. | |
| 2002/0149002 A1 | 10/2002 | Womelsdorf et al. | |
| 2003/0180466 A1 | 9/2003 | Rohrbaugh et al. | |
| 2004/0023824 A1 | 2/2004 | Zuechner et al. | |
| 2005/0004317 A1 | 1/2005 | Auschra et al. | |
| 2005/0048010 A1 | 3/2005 | Kliss et al. | |
| 2005/0182174 A1 | 8/2005 | Michael et al. | |
| 2005/0260269 A1 | 11/2005 | Engelbrecht et al. | |
| 2006/0009370 A1 | 1/2006 | Zuechner et al. | |
| 2006/0027141 A1 | 2/2006 | Tarng et al. | |
| 2006/0030656 A1 | 2/2006 | Tarng et al. | |
| 2006/0160950 A1 | 7/2006 | Auschra et al. | |
| 2006/0194886 A1 | 8/2006 | Adam et al. | |
| 2008/0191168 A1 | 8/2008 | McKigney et al. | |
| 2008/0255273 A1 | 10/2008 | Pepe et al. | |
| 2008/0257213 A1 | 10/2008 | Friedrrich et al. | |
| 2009/0107362 A1 | 4/2009 | Tarng et al. | |
| 2010/0096601 A1 | 4/2010 | Distefano | |
| 2010/0137495 A1 | 6/2010 | Tarng et al. | |
| 2010/0190637 A1 | 7/2010 | Koch et al. | |
| 2010/0218702 A1 | 9/2010 | Tarng et al. | |
| 2010/0311862 A1 | 12/2010 | Engelbrecht et al. | |

FOREIGN PATENT DOCUMENTS

| | | |
|---|---|---|
| DE | 199 52 383 A1 | 5/2001 |
| DE | 102005053705 A1 | 5/2007 |
| GB | 2 293 373 A | 3/1996 |
| WO | 95/24359 | 9/1995 |
| WO | 01/83662 A1 | 11/2001 |
| WO | 03/046029 A1 | 6/2003 |
| WO | 2005/060610 A2 | 7/2005 |
| WO | 2005/071029 A2 | 8/2005 |
| WO | 2005/110339 A1 | 11/2005 |
| WO | 2005/119359 A2 | 12/2005 |
| WO | 2008/049679 A1 | 5/2008 |

OTHER PUBLICATIONS

Co-assigned U.S. Appl. No. 13/145,002.

* cited by examiner

*Primary Examiner* — Robert D. Harlan
(74) *Attorney, Agent, or Firm* — Abel Law Group, LLP.

(57) ABSTRACT

Nanoscale ZnO particles are used in aqueous binder systems for increasing the blocking resistance, for reducing the drying time and/or for increasing the resistance to chemicals, detergents, heat, weathering or biological assault on the dried or cured systems. Described further more are nanoscale zinc oxide particles surface-modified with phosphonocarboxylic acid, and their use.

20 Claims, No Drawings

ZINC OXIDE PARTICLES WHICH HAVE BEEN MODIFIED WITH PHOSPHONOCARBOXYLIC ACID AND USE OF ZINC OXIDE PARTICLES

BACKGROUND OF THE INVENTION

1. Field of the Invention

The invention relates to nanoparticulate zinc oxide, coated with a phosphonocarboxylic acid, and to the use of nanoparticulate zinc oxide.

2. Discussion of Background Information

The importance of water-based binder systems such as coating systems in industrial application is becoming increasingly greater. Reasons for this are primarily statutory impositions relating to the environment-friendliness of the coating systems and binder systems to be used, an example being the VOC Directive. However, water-based systems still often show disadvantages over solvent-based systems, such as poor blocking resistance or long drying times, for example, which severely delay the further-processing or utilization of, for example, painted parts.

Zinc oxide is already used for various purposes in water-based paints. Its use as a white pigment is well known. In wood paints, ZnO, alongside other zinc salts, is used as an additive in order to prevent the bleeding of tannic acid. It is also used in primers on metals, as an adhesion promoter. These applications utilize zinc oxide particles having a diameter of more than 1 μm.

Zinc oxide and other metal oxides are also used in paints in order to enhance UV protection, solvent resistance, and surface hardness. WO 2008/049679 describes the use of nanoparticles for paints on an organic solvent basis in order to achieve an improvement in the scratch resistance and in the flexibility. U.S. Pat. No. 6,342,556 describes the use of ZnO particles having a diameter of 10 to 80 nm in water in combination with paints for enhanced UV protection of wood.

WO 2005/071002 relates to the use of a dispersion comprising ZnO having a BET surface area of 10 to 200 $m^2/g$ as transparent UV protection in paints. The ZnO particles described in this application are pyrogenically prepared particles which in dispersion have an average secondary particle size of less than 300 nm. These pyrogenically produced particles do possess a specific surface area in the order of magnitude of nanoparticulate zinc oxide, but cannot be used to produce transparent coats. The additive specified in WO 2005/071002, therefore, is unsuitable for use in transparent coating systems.

WO 2005/071029 uses zinc oxide having a particle diameter of less than 100 nm in order to enhance the surface hardness and the scratch resistance of polyurethane (PUR) paints. WO 2006/023064 describes the use of ZnO dispersions in PUR binders for producing scratch-resistant floor coatings. WO2006/023064 describes the production of scratch-resistant wood preservative paints through the use of ZnO dispersions in acrylic binders.

WO 2006/023064 describes the use of 2% to 20% of nanoscale zinc oxide in acrylate-containing paints and coatings in order to improve, for example, the adhesion, tannin resistance or corrosion resistance. Since the fraction of the relatively costly ZnO is more than 2%, the composition is often difficult to establish economically for the topcoat segment. WO 2006/023065 relates to coating compositions which comprise microscale $TiO_2$ pigments and nanoscale metal oxide such as ZnO, the purpose of the nanoscale metal oxide being to ensure uniform spacing of the $TiO_2$ pigments in the coat.

WO 2005/119359 and US-A1-2003/0180466 describe film-forming compositions which comprise binder, nanoparticle, surfactant, and a polymeric dispersant, in order to improve the abrasion resistance of substrates coated with said compositions.

WO 2008/064114 relates to the use of ZnO particles having a diameter of less than 1 μm in an acrylate hybrid paint for improving the solvent resistance, the moisture resistance, and the UV resistance.

DE 102007032189 A1 describes a specific nanoscale ZnO, prepared by sol-gel methods in organic solvents, it being possible for the ZnO to be surface-modified with Si-containing molecules. Resultant ZnO particle dispersions in organic solvents are utilized as a catalyst in order to increase the crosslinking rate in—for example—two-component PU paints. A disadvantage, in addition to the costly and inconvenient production method, is that the system can be employed only for solventborne paints and only for two-component systems. The severely curtailed potlife is a further disadvantage, since the time window for further-processing is significantly restricted.

For producing stable coating dispersions and binder dispersions which comprise ZnO it is necessary for the ZnO particles to have a like charge. Water-based binder systems, including coating compositions and latex dispersions, are frequently composed of anionically stabilized particles. Many of these dispersions are formulated at pH levels of between 7 and 9. The isoelectric point of ZnO is situated at a pH of around 9-9.5. Therefore, ZnO particles with a pH of less than 9 are present in positive and hence cationic form. Formulating the pH of a ZnO dispersion above the isoelectric point, in order thus to obtain negatively charged particles, is not possible, owing to the amphoteric nature of the zinc oxide, which then dissolves.

DE 10163256 A1 discloses a zinc oxide surface-modified with an oligo- or polyethylene glycol acid. The zinc oxide surface-modified in this way can be dispersed in water. A disadvantage is the modification of the zinc oxide in a non-aqueous environment. In order to obtain an aqueous dispersion, the organic solvent must first be removed and then the ZnO modified with an oligo polyethylene glycol acid must be dispersed in water again. The application of the dispersion is restricted on account of the positive zeta potential.

One possible way of stabilizing ZnO is to shift the isoelectric point toward lower pH levels. This can be done using polyelectrolytes. WO A 95/24359, for example, uses the sodium salt of a polyacrylic acid as a milling additive in the milling of zinc oxide. E. Tang et. al., in Appl. Surf. Sci., 252, 2006, 5227-5232, describe the use of a polymethacrylic acid having a molar mass of less than 10 000 g/mol in water, which is adjusted with NaOH to a pH of 5.0-5.5, for stabilizing an aqueous zinc oxide dispersion. For the preparation of stable nanoscale dispersions, large amounts of the polymethacrylic acid are required, such as 10% to 50%, based on the nanoscale powder. In addition there is a tendency toward bridging at high solids fractions.

WO 2007/082155 relates to the use of salts of 2,3-dihydroxynaphthalene-6-sulfonic acid, and catechol-3,5-disulfonates, for dispersing zinc oxide in the presence of ethylene glycol, propylene glycol, glycerol or the monoethers thereof. This is another means for shifting the isoelectric point toward lower pH levels. A disadvantage is that the dispersions undergo severe discoloration, particularly under the influence of light or in the presence of transition metal ions, especially iron ions, and this severely restricts the application of the ZnO dispersions in paints.

Another possible way of shifting the isoelectric point toward lower pH levels is to envelop the particles with a layer of silica. $SiO_2$ has an isoelectric point of 2 and is negatively charged above this pH level. DE 10118309 C2 describes the preparation of an anionically stabilized, aqueous dispersion of nanoparticulate zinc oxide and the use thereof as a vulcanization activator for the vulcanization of latex moldings. The negative charge on the particle there is achieved by envelopment with silicates. For this purpose, at pH levels below the isoelectric point, zinc oxide is dispersed in water and alkali metal silicate solutions or waterglass/base mixtures are added, and so ZnO is converted to an anionic charge. A disadvantage is the growth rate of the silicates, which must be controlled such that no relatively large agglomerates are formed. Ions introduced by the alkali metal silicate must subsequently be removed from the dispersion, in order to obtain a sufficient shelflife at economical concentrations.

Phosphonates are used industrially in cooling-water systems, in desalination plants, and in oil extraction, where they prevent the precipitation of salts. In the paper and textiles industries, they are used as a stabilizer for peroxide bleaching, thereby complexing metals which otherwise deactivate the peroxide. 2-Phosphono-1,2,4-butanetricarboxylic acid is used in the treatment of cooling water and process water, and also in the sector of cleaning formulations, as an inhibitor both of scale and of corrosion.

EP 0760387 B1 relates to an anticorrosive pigment comprising a metal organophosphonate. The pigments are prepared by reacting organophosphonic acids or phosphonocarboxylic acids with suitable polyvalent metal cations, in the form, for example, of oxides, hydroxides, carbonates, chlorides, nitrates or sulfates. When the oxides or hydroxides are used, a simple acid-based reaction takes place, the oxides or hydroxides being thereby converted into the corresponding phosphonate salts.

There is therefore a need for additives for aqueous binder systems, such as coating systems, for example, with which the drying time can be significantly shortened and the blocking resistance increased, without impairing the overall profile of the binder system through the addition of large quantities. Even small quantities of less than 2% by weight are to achieve a significant effect here, in order not adversely to affect the production costs, and in order to detract as little as possible from the other properties of the binder system, especially of a paint.

The object of the invention, therefore, was to provide a material which enhances the drying properties and the blocking behavior of water-based binder systems, more particularly coating systems.

SUMMARY OF THE INVENTION

The present invention provides method of reducing the drying time and/or of increasing the blocking resistance and/or of increasing the resistance against chemicals, detergents, heat, weathering and/or biological assault of a dried and/or cured aqueous binder system. The method comprises combining the aqueous binder system with nanoscale ZnO particles.

In one aspect of the method, the nanoscale ZnO particles may be added to the aqueous binder system as a powder and/or as a dispersion, e.g., as an aqueous dispersion.

In another aspect of the method, the binder system may be a coating composition.

In yet another aspect, the nanoscale ZnO particles may comprise particles which have been surface-modified, e.g., with a phosphonocarboxylic acid and/or a salt thereof.

The present invention also provides surface-modified nanoscale zinc oxide particles which are surface-modified with a phosphonocarboxylic acid and/or a salt thereof.

In one aspect, the particles may be present as a powder or may be present as an aqueous dispersion.

In another aspect, the particles may be surface-modified with a mixture of a phosphonocarboxylic acid and a salt thereof.

In yet another aspect, the salt of the phosphonocarboxylic acid may comprise an alkali metal salt and/or an ammonium salt.

In a still further aspect, the phosphonocarboxylic acid may comprise 2-phosphono-1,2,4-butanetricarboxylic acid. For example, the particles may be surface-modified with a mixture of 2-phosphono-1,2,4-butanetricarboxylic acid and one or more salts of 2-phosphono-1,2,4-butanetricarboxylic acid with monovalent cations ($M^+$), the molar ratio of $M^+$ to 2-phosphono-1,2,4-butanetricarboxylic acid and salt(s) thereof being from 0.1:1 to 3:1. $M^+$ may comprise an alkali metal cation and/or an ammonium cation.

The present invention also provides a process for preparing the surface-modified nanoscale ZnO particles of the present invention as set forth above. The process comprises subjecting ZnO particles in a liquid medium to a dispersing treatment in the presence of a phosphonocarboxylic acid and/or a salt thereof.

The present invention also provides a UV protection agent, catalyst, activator for vulcanization, component for producing optical systems or electronic components and/or agent for modifying optical or electronic properties of moldings, coatings or bulk materials that comprises the surface-modified nanoscale ZnO particles of the instant invention as set forth above (including the various aspects thereof).

DETAILED DESCRIPTION OF THE INVENTION

Surprisingly it has been found that in aqueous binder systems the use of ZnO nanoparticles, in the form, for example, of a powder or of a dispersion, increases the blocking resistance and significantly reduces the drying time. The addition of the nanoscale ZnO particles to the aqueous binder system produces a surprisingly great shortening in the drying time and also a surprising improvement in the blocking resistance of the cured binder system, in the case, for example, of a paint applied to the substrate and dried or cured, in comparison to paints which contain no nanoscale ZnO particles.

It is indeed known that ZnO or Zn compounds catalyze the crosslinking of double bonds; in the course of film formation in aqueous emulsion paints or dispersion-based binder systems, however, particularly in the case of one-component systems, rather than further crosslinking of, for example, double bonds, there is a physical coalescence of the binder particles after removal of the liquid phase and possibly after an increase in temperature. It was surprising, therefore, that blocking resistance and drying time were improved by addition of nanoscale ZnO in the systems described.

It has emerged, furthermore, that the use of nanoscale ZnO particles in aqueous binder systems increases the resistance of the dried or cured binder system to chemicals, detergents, heat, weathering and/or biological assault.

It has emerged, moreover, that it is particularly advantageous if the ZnO particles used for this purpose are nanoscale particles modified with a phosphonocarboxylic acid. The nanoscale ZnO particles modified with phosphonocarboxylic acids exhibit not only a greatly improved dispersing capacity in water, but also a very high compatibility with the dried paint films. This is manifested, for example, in increased transparency and absence of haze in unpigmented paint films which comprise, rather than the conventional ZnO particles, nanoscale ZnO particles modified with phosphonocarboxylic acids. Further advantages of the nanoscale ZnO particles of the invention, modified with phosphonocarboxylic acid, are the formation of a more stable dispersion and the possibility of obtaining ZnO dispersions having particles that are smaller in comparison to conventional ZnO dispersions.

The present invention accordingly provides for the use of nanoscale ZnO particles in an aqueous binder system for shortening the drying time and/or for improving the blocking resistance and/or for increasing the resistance of dried or cured binder systems to chemicals, detergents, heat, weathering and/or biological assault. The invention further relates to surface-modified nanoscale zinc oxide particles wherein the zinc oxide particles are surface-modified with a phosphonocarboxylic acid, a salt of the phosphonocarboxylic acid, or a mixture thereof. The invention is elucidated comprehensively below.

The nanoscale ZnO particles are added as an additive to an aqueous binder system in order to shorten the drying time of the binder system and/or the blocking resistance of the binder system. The drying time relates to the duration of the drying of the aqueous binder system under given conditions in an intended application, as for example following application of an aqueous coating composition to a substrate, with subsequent drying and/or curing. As is known to those in the art, the blocking resistance of the aqueous binder system means the following property of the dried and/or cured binder system: blocking means the welding-together of two coated articles under heat, pressure or moisture. The blocking resistance is a measure of the blocking, and is evaluated on a scale from 0 to 5. In this scale, the lower the figure, the less the blocking. The blocking test took place in accordance with guideline 6 "Blocking of paint systems on wooden windows" (March 1999) of the Institut für Fenstertechnik e.V., Rosenheim.

The nanoscale ZnO particles are added as an additive to an aqueous binder system in order to increase the resistance of the dried or cured binder system to chemicals, detergents, heat, weathering and/or biological assault. The chemical resistance relates to the resistance toward chemicals, more particularly liquids, such as water, solvents, gasoline or detergents, for example.

The chemical resistance may be determined, for example, in accordance with ASTM D-54021 (rub test), in which a cloth soaked with the chemical or with the detergent is rubbed under a defined applied pressure over a coated surface, and a measurement is made of the number of double rubs until there is full destruction of the coating, or else in accordance with EN ISO 2812-3 and DIN EN ISO 4628-2 (spot test), in which a drop of the chemical or detergent is applied to a coated substrate and, after a defined exposure time, is wiped off, at which point the damage is then visually assessed. The heat resistance relates to the resistance to thermal decomposition or sticking, at elevated temperatures, of the dried or cured system. The weathering resistance can be determined in accordance with DIN EN ISO 11507, by exposing coated substrates to a humid atmosphere and temperature changes under UV irradiation for approximately 1000 h and then subjecting them to visual evaluation.

The resistance to biological assault relates to resistance by the dried or cured system to infestation with fungi, molds, algae, bacteria or other biological systems. The nanoscale ZnO particles are therefore suitable for use as a biocide, more particularly fungicide and algicide, in aqueous binder systems.

The increase in the blocking resistance and the stated increase in the resistance through use of the nanoscale ZnO particles in aqueous binder systems relate to the blocking resistance and resistance of the dried or cured binder system. In the context of their use in accordance with the invention, nanoscale ZnO particles are added to the aqueous binder system, the aqueous binder system is applied to a substrate, and then the binder system is dried and/or cured. The nature of the drying or curing is guided by the binder system and is carried out in a manner familiar to the skilled person, as for example by evaporating, heating and/or irradiating. The drying or curing may encompass physical drying and/or chemical curing or crosslinking.

The aqueous binder system to which the nanoscale ZnO particles are added as an additive in accordance with the use according to the invention may be any customary aqueous binder system known to the skilled person. Water-based binder systems of these kinds are available commercially. The binder system is water-based—in other words, a substantial part, at least 20% by weight, for example, of the solvent used in the binder system is water. The aqueous binder system may where necessary also comprise organic solvent, but in general the binder system contains less than 20%, preferably less than 10%, by weight, of organic solvents, based on the total weight of the binder system.

The aqueous binder system comprises one or more organic or inorganic binders. This may include any binder which is customary for aqueous binder systems. Examples of suitable binders are polyesters, polyester acrylates, polyesterurethane acrylates, polyurethanes, including one-component and two-component systems, straight acrylates, acrylate copolymers, including acrylate-styrene copolymers, butyl acrylate-styrene copolymers, methyl methacrylate-butyl acrylate copolymers, acrylate-vinyl acetate copolymers, acrylate-polyurethane copolymers (hybrid polymers), acrylate-epoxy copolymers, and aromatic epoxide acrylates, styrene-butadiene copolymers, polybutadienes, latexes, epoxides, polyamides, polyimides, polyolefins, polychloroprene, phenolic resins, ethylene-vinyl acetates, melamine-formaldehyde resins, and silicones. As the aqueous binder system it is also possible to use aqueous binder emulsions or binder dispersions of the aforementioned polymers and/or binders. The aqueous binder systems in question may be, for example, chemically drying systems or, more particularly, physically drying systems.

These known aqueous binder systems may preferably be used in order to form films, or paint films—in other words, the aqueous binder system is preferably a coating composition or a paint. Water-based paint systems are a particularly suitable field of application for the use in accordance with the invention. They are suitable for coatings on uncoated or precoated substrates of all kinds, composed of paper, glass, metal, ceramic, wood, stone or plastic, for example. The substrate may take any form, as for example a panel or film or a surface of any desired article. The aqueous binder system is preferably transparent after drying or curing; more particularly it is an aqueous coating composition which produces a transparent coating.

Other possible fields of use of the binder systems are, for example, their use as adhesives or for sealing. The aqueous binder systems find further application as conventional binders, such as in the textile industry, for example, where aqueous binder systems are used inter alia in the production of what are called nonwovens, e.g., nonwoven fabrics. In this application, expressed in simplified form, textile fibers are bonded together with a binder system to form a sheetlike textile. Aqueous binder systems are also used in nontextile applications, as in the case, for example, of fiber mats, one instance being rock wool for insulation.

The aqueous binder system may therefore, for example, be an aqueous paint, an aqueous adhesive, an aqueous sealant or an aqueous binder, with preference being given to an aqueous paint. In addition to the binder and the solvent, these binder systems may comprise further components which are commonly used in such aqueous binder systems, such as paints, adhesives, sealants or binders. In accordance with the use of the invention, the nanoscale ZnO particles may be added to the paint, adhesive, sealant or binder already comprising all of the desired components. The addition of the nanoscale ZnO particles and of the respective optional additional components to the aqueous binder system, however, is arbitrary.

Besides the binder and the solvent, the aqueous binder system may comprise further components which are commonly used in binder systems. Examples of such components suitable for aqueous binder systems, such as paints, adhesives, sealants or binders, for example, more particularly paints, are plasticizers, dyes, fillers, pigments, and auxiliaries, such as, for example, flow control agents, dryers, antiskinning agents, curing accelerators, wetting agents, and antisettling agents. The aqueous paint may be transparent or colored—i.e., a clearcoat or a pigmented paint.

The ZnO particles used are nanoscale. By nanoscale particles are meant, typically in the art, particles having an average diameter of less than 1 μm. The average particle diameter, also referred to as the $d_{50}$ value, relates here to the volume average of the particle diameter. The average particle diameter may be determined by means of a dynamic scattered light method, as for example with the Nanotrac particle size analyzer instrument from Microtrac Inc., USA. The average particle diameter or $d_{50}$ value is obtained from the particle size distribution. The $d_{50}$ value is defined such that 50 percent by volume of the particles have a diameter which is smaller than the $d_{50}$ value. Correspondingly, 50 percent by volume of the particles have a diameter which is greater than the $d_{50}$ value. In a similar way, the $d_{90}$ value or $d_{90}$ particle diameter is defined such that 90 percent by volume of the particles have a diameter which is smaller than the $d_{90}$ value.

The average particle diameter or $d_{50}$ value of the nanoscale ZnO particles is below 1 μm and preferably not more than 500 nm, more preferably not more than 100 nm. The nanoscale ZnO particles, further, preferably have a $d_{90}$ particle diameter of not more than 500 nm and more preferably not more than 200 nm.

Nanoscale ZnO particles are known and are available commercially or can easily be prepared by methods known to the skilled person. The zinc oxide can be prepared, for example, by flame pyrolysis, via precipitation reactions or sol-gel reactions. The zinc oxide particles may consist of ZnO. The zinc oxide particles used here, however, also include particles of zinc oxide comprising doping in the crystal lattice, and doped zinc oxides, and also particles which have a core-shell structure, the surface or shell consisting of zinc oxide, or particles which comprise zinc oxide on the surface. The ZnO particles can also, as is known in the art, be surface-modified with suitable compounds, such as with modifiers, surfactants or stabilizers, for example. Surface-modified or stabilized nanoscale ZnO powders or nanoscale ZnO dispersions of these kinds are customary and are available commercially.

The nanoscale zinc oxide particles are added to the binder system as an additive in order to achieve the stated improvements in properties. The zinc oxide particles can be added as an additive in any desired form, such as in the form of a powder or a dispersion of the ZnO particles in a liquid medium, such as water or an organic solvent, such as an alcohol, or a mixture thereof, for example, with preference being given to an aqueous liquid medium. The preferred aqueous liquid medium may optionally also comprise organic solvent, e.g., less than 20%, preferably less than 10%, and more preferably less than 5%, by weight, based on the total weight of water and organic solvent in the aqueous dispersion. The addition of the nanoscale ZnO particles to the aqueous binder system may be accomplished by simple shaken introduction or poured introduction and mixing. It is possible optionally for a dispersing method, described below, to be used, for improved dispersing or homogenizing.

Where the ZnO particles are added in the form of a dispersion to the binder system, the amount of ZnO in the dispersion may vary within wide ranges. The nanoscale ZnO particle content of the dispersion, preferably an aqueous dispersion, may amount, for example, to 1% to 75%, preferably 5% to 70%, and more particularly 15% to 65%, by weight, based on the total weight of the aqueous dispersion.

The ZnO particles or the dispersion comprising ZnO particles, which is to be added as an additive to the binder system may further comprise further auxiliaries, known per se, in order, as and when necessary, to suitably adjust further properties of the additive or of the binder system. Examples of such auxiliaries are ethylene glycol and derivatives thereof, propylene glycol and derivatives thereof, glycerol and derivatives thereof, defoamers, flow control additives, thickeners, rheological additives, wetting assistants, preservatives, and corrosion inhibitors.

For preparing the dispersion of the nanoscale ZnO particles in a liquid medium it is possible to use known dispersing methods and dispersing apparatus, examples being rotor-stator systems, ultrasound or roll mechanisms. Dispersing methods and suitable dispersing apparatus of these kinds are described in, for example, WO 2004/069400 (DE 10304849 A1), hereby incorporated by reference.

The ZnO particles may be dispersed using, for example, a dispersing apparatus in a liquid medium, preferably an aqueous medium. Examples of suitable dispersing apparatus include mills, kneading devices, roll mills, nozzle jet dispersers, more particularly homogenizers, turbo stirrers, mills with loose grinding media, more particularly agitated ball mills, shearing roll kneaders, mortar mills, colloid mills, and roll mills. Highly suitable are mills, more particularly agitated ball mills, having very small grinding media, examples being grinding media having a diameter of not more than 2.5 mm, more preferably not more than 1.5 mm, and very preferably not more than 1.0 mm, and not less than 0.005 nm, preferably not less than 0.02 mm, more preferably not less than 0.05 mm.

The dispersing treatment may also effect a grinding or comminution of the ZnO particles, and so the nanoscale ZnO particles of desired size are in fact formed by the dispersing treatment. The ZnO particles used as starting material may therefore be larger than those obtained after the dispersing treatment.

The fraction of nanoscale ZnO particles in the aqueous binder system may vary within wide ranges. The fraction of the nanoscale ZnO particles in the aqueous binder system may be situated, for example, in the range from 0.01% to 10%, preferably 0.1% to 5%, and more preferably 0.1% to 2%, by weight, based on the solids content of the aqueous binder system.

The addition of the nanoscale ZnO particles, preferably in the form of an aqueous dispersion, to the aqueous binder system results, as already elucidated above, in an increase in the blocking resistance of the dried or cured binder system and/or in a reduction in the drying time of the binder system and/or in an improvement in the resistance of the dried or cured binder system to chemicals, detergents, heat, weathering or biological assault. Particularly good results have been achieved using zinc oxide particles modified on the surface with phosphonocarboxylic acid. Surprisingly, when using ZnO particles modified with phosphonocarboxylic acid, a reduced haze is observed as well, such haze being frequently observable with typical ZnO particles. This is an advantage, for example, in transparent coatings and, generally, in applications where the optical properties have a part to play. Moreover, as compared with conventional ZnO dispersions, more stable ZnO dispersions, optionally with a smaller average particle diameter, can be obtained. The use of these ZnO particles modified with phosphonocarboxylic acid is therefore preferred. Phosphonocarboxylic acid-modified ZnO particles of these kinds have not been hitherto described in the art, and are an aspect of the present invention. They are therefore elucidated in more detail below.

For the nanoscale ZnO particles modified with phosphonocarboxylic acid, all of the details given above apply equally—for example, to the nanoscale ZnO particles, to the dispersions comprising nanoscale ZnO particles, to the use thereof and to the aqueous binder systems, to the fraction of nanoscale ZnO particles in the aqueous binder system, and so on. In addition, however, the ZnO particles are coated or modified on the surface with phosphonocarboxylic acid, with a salt of phosphonocarboxylic acid, or with a mixture thereof. The modified ZnO particles obtained in this way are sometimes also referred to in this description, in simplified form, as ZnO particles modified with phosphonocarboxylic acid.

Phosphonocarboxylic acids are known and are available commercially or can easily be prepared by known processes. All known phosphonocarboxylic acids or their salts are suitable. The phosphonocarboxylic acid may have one or more phosphono groups ($-PO(OH)_2$), with one or two phosphono groups being preferred. The phosphonocarboxylic acid may have one or more carboxyl groups ($-COOH$), in which case preferably at least two and more preferably three carboxyl groups are present. The phosphonocarboxylic acid may optionally contain further functional groups, examples being one or more hydroxyl groups. With preference the phosphonocarboxylic acid is an aliphatic carboxylic acid or an aliphatic hydroxycarboxylic acid, in each case having at least one phosphono group and 1, 2, 3, 4 or more carboxyl groups, with 2 and more particularly 3 carboxyl groups being preferred.

Suitable examples of phosphonocarboxylic acids which can be employed are monophosphonocarboxylic acids of the general formula $R^1R^2C(PO_3H_2)(CO_2H)$, in which $R^1$ and $R^2$ may be identical or different and are in each case selected from $-H$, $-OH$, $-CH_3$, $-C_2H_5$, $-C_3H_7$, $-CH(CO_2H)-CH_2CO_2H$, and $-CH_2-(CH_2)_n-CO_2H$, in which n is an integer from 0 to 18, and diphosphonoalkanecarboxylic acids of the general formula $R^3R^4C(PO_3H_2)_2$, in which $R^3$ and $R^4$ may be identical or different and are in each case selected from $-H$, $-OH$, $-CH_3$, $-C_2H_5$, $-C_3H_7$, $-CH(CO_2H)-CH_2CO_2H$, and $-CH_2-(CH_2)_n-CO_2H$, in which n is an integer from 0 to 18, with at least one of the radicals $R^3$ and $R^4$ being a group having at least one radical $-CO_2H$, and also salts of these monophosphonocarboxylic acids and diphosphonoalkanecarboxylic acids.

Examples of specific suitable phosphonocarboxylic acids are phosphonoacetic acid, 2-carboxyethanephosphonic acid, 2-hydroxy-2-phosphonoacetic acid, 2-phosphono-1,2,4-butanetricarboxylic acid (PBTC), and salts thereof 2-Phosphono-1,2,4-butanetricarboxylic acid and its salts are particularly preferred and are available commercially. For example, a 50% strength aqueous solution of 2-phosphono-1,2,4-butanetricarboxylic acid (Bayhibit® AM), or the tetrasodium salt of 2-phosphono-1,2,4-butanetricarboxylic acid (Bayhibit® S), is sold by Lanxess AG.

It is possible to use one phosphonocarboxylic acid or a mixture of two or more phosphonocarboxylic acids for the surface modification of the nanoscale ZnO particles. The phosphonocarboxylic acid or acids may also be used in the form of their salts or, preferably, as a mixture of the phosphonocarboxylic acid and a salt of the phosphonocarboxylic acid.

Since the phosphonocarboxylic acids are acids having a basicity of two or more, different salts are possible. The salt in question may be, for example, a salt in which all of the acid groups are neutralized, or a salt in which only some of the acid groups are neutralized. Preference is given to using a mixture of phosphonocarboxylic acid and one or more salts of one or more conjugate bases of the phosphonocarboxylic acid, the ratio of phosphonocarboxylic acid to salt of phosphonocarboxylic acid being suitably such that 2% to 75% of all of the acid groups in the phosphonocarboxylic acid are neutralized and are present in the form of the conjugate base or the salt, and, correspondingly, 98% to 25% of all of the acid groups in the phosphonocarboxylic acid are present in the acid form.

A commercially available salt of a phosphonocarboxylic acid may be used. A salt may also simply be formed from a phosphonocarboxylic acid by addition of a suitable base. Generally speaking, the neutralization with the base takes place preferably in a solvent, such as in water, an organic solvent or a mixture thereof, for example. It is preferred to use water or an aqueous liquid as solvent. The salt formed may be isolated, though in general it is useful to use the resulting solution of the salt directly for the reaction with the nanoscale ZnO particles. It is also conceivable first to mix the nanoscale ZnO particles with the phosphonocarboxylic acid and then to add the base in an appropriate amount.

Bases suitable for preparing the salts include all customary bases that are used in the art. Use may be made, for example, of bases which contain or form divalent or trivalent cations. Examples of such bases are $CaO$, $Ca(OH)_2$, $Mg(OH)_2$, $Sr(OH)_2$, and $Ba(OH)_2$. Preference, however, is given to using bases which contain or form monovalent cations, with alkali metal cations and ammonium cations being particularly preferred. Alkali metal cations are Li, Na, K, Rb, and Cs cations. Suitable bases are, for example, NaOH, KOH, aqueous ammonia, primary, secondary, and tertiary amines, such as triethanolamine, and quaternary ammonium compounds, such as tetramethylammonium hydroxide, for example. Accordingly, the salts of the phosphonocarboxylic acid may be salts with divalent or trivalent cations, but are preferably salts of the phosphonocarboxylic acid with monovalent cations, more preferably alkali metal salts and ammonium salts, even more preferably Na salts, K salts or ammonium salts.

As elucidated above, it is preferred to use mixtures of phosphonocarboxylic acid and salts of the phosphonocarboxylic acid. For the purpose of preparation, phosphonocarboxylic acid and salt of phosphonocarboxylic acid may be mixed, as starting materials, in a suitable ratio. The mixture may also be obtained by addition of a suitable amount of base to a phosphonocarboxylic acid, so that the salt is foamed "in situ". It is also possible to start from a salt of the phosphonocarboxylic acid and to form the corresponding phosphonocarboxylic acid in situ by adding a suitable amount of acid, e.g., hydrochloric acid, sulfuric acid or acetic acid. The skilled person is able easily to prepare such mixtures of phosphonocarboxylic acid and salts of phosphonocarboxylic acid in the desired proportion.

As already indicated, 2-phosphono-1,2,4-butanetricarboxylic acid (PBTC), salts of PBTC, and mixtures of PBTC and salts of PBTC are used with particular preference for modifying the ZnO particles. The salts of PBTC are preferably salts of monovalent cations, more particularly alkali metal salts and ammonium salts, with Na salts, K salts, and ammonium salts being particularly preferred.

In the mixtures of PBTC and salts of PBTC with monovalent cations $M^+$ that are preferably used, with $M^+$ preferably being alkali metal or ammonium, or in the salts of PBTC, the molar ratio of $M^+$:PBTC is in the range, for example, of 0.1:1 to 4:1, preferably in the range from 0.1:1 to 3:1, and more preferably from 0.1:1 to 1.8:1. Mixtures of this kind may be obtained, for example, by reacting the corresponding bases with PBTC or by mixing and/or reacting PBCT with the tetraalkali metal salt or tetraammonium salt of 2-phosphono-1,2,4-butanetricarboxylic acid.

The precise mechanism of the attachment of the phosphonocarboxylic acid or of the salts thereof for the surface modification of the ZnO particles with phosphonocarboxylic acid or salts thereof is not specifically known. Without wishing to be tied to any one theory, however, it is thought that the phosphonocarboxylic acid or salts thereof forms a complex, via the phosphonate function, alone or together with a carboxylate function, with surface groups on the ZnO particles. As an alternative or an additional possibility it might also be the case that, with zinc ions, a complex with the phosphonocarboxylic acid or salt thereof is formed, which then is bonded coordinatively on the surface of the ZnO particles.

The nanoscale ZnO particles which are modified on the surface with phosphonocarboxylic acid, with a salt of phosphonocarboxylic acid or with a mixture thereof are obtained by reaction of phosphonocarboxylic acid, a salt of phosphonocarboxylic acid or a mixture thereof with ZnO particles. The reaction may take place without a solvent, but is usefully performed in a solvent. As solvent it is possible to use the above-described liquid medium, preferably the aqueous liquid medium employed for preparing the dispersion of the ZnO particles, and, accordingly, reference is made to the details stated there. The sequence in which the components are mixed in this case is arbitrary.

The ratio of phosphonocarboxylic acid and salt of phosphonocarboxylic acid to ZnO particle may vary within wide ranges, but is usefully, for example, in the range from 0.005 mmol to 10 mmol of phosphonocarboxylic acid and salt of phosphonocarboxylic acid per g of zinc oxide, preferably in the range from 0.01 to 8 mmol of phosphonocarboxylic acid and salt of phosphonocarboxylic acid per g of zinc oxide, and more preferably from 0.05 to 1 mmol of phosphonocarboxylic acid and salt of phosphonocarboxylic acid per g of zinc oxide.

In one useful embodiment it is possible for example, to form or introduce, first of all, phosphonocarboxylic acid, a salt of a phosphonocarboxylic acid, or a mixture of phosphonocarboxylic acid and salt of the phosphonocarboxylic acid in the liquid medium as elucidated above. Added thereto are ZnO particles, either as a dispersion or, preferably, as powder. The mixture is then preferably subjected to a dispersing method.

It is possible to use the aforementioned dispersing methods and dispersing apparatus for preparing the dispersion of the nanoscale ZnO particles in the same way, and so reference is made to the details given above. The sole difference lies in the additional use of the phosphonocarboxylic acid component. The modifying of the ZnO particles by the phosphonocarboxylic acid, a salt of the phosphonocarboxylic acid or a mixture thereof on the surface takes place in general even at room temperature (20° C.) and is assisted by the dispersing treatment. As and when necessary, the reaction may also be carried out at high temperatures.

It is preferred to carry out the dispersing treatment of the ZnO particles in a liquid medium in the presence of the phosphonocarboxylic acid, a salt of the phosphonocarboxylic acid or a mixture thereof in a mill, preferably an agitated ball mill, with very small grinding media, e.g., grinding media having a diameter of not more than 2.5 mm, more preferably not more than 1.5 mm, and very preferably not more than 1.0 mm, and not smaller than 0.005 mm, preferably not smaller than 0.02 mm, more preferably not smaller than 0.05 mm. In this way, at the same time, very rapid dispersing and modifying of the ZnO particles is achieved, and an extremely stable dispersion is obtained.

Since, as elucidated above, the dispersing treatment may also be accompanied by grinding or comminution of the ZnO particles, the ZnO particles used as starting material may also have a larger average particle diameter than the nanoscale ZnO particles modified with phosphonocarboxylic acid that are obtained after the dispersing treatment. It is generally preferred, however, to use nanoscale ZnO particles as starting material.

The dispersion obtained can be used as it is. This dispersion, surprisingly, is largely clear; no haze can be ascertained. By removing the liquid medium in a conventional procedure, such as centrifugation or evaporation, for example, the nanoscale ZnO particles modified with phosphonocarboxylic acid can be obtained in powder form.

As elucidated above, the nanoscale ZnO particles modified with phosphonocarboxylic acid, in the form of a dispersion or a powder, can be used for increasing the blocking resistance and/or for reducing the drying time of aqueous binder systems and/or for increasing the resistance as elucidated above. They can also be employed, furthermore, for all applications for which the use of nanoparticulate zinc oxide is known. For example, the nanoscale ZnO particles modified with phosphonocarboxylic acid can be used in accordance with the invention also as vulcanization activators for the vulcanization of latex moldings, as a UV protection, as a catalyst, for producing optical systems, for producing electronic components, or for modifying optical or electronic properties of substrates or bulk materials.

The invention is elucidated further below by means of examples, which, however, are not intended to restrict the scope of the present invention.

EXAMPLE 1

397.49 g of a 2-phosphono-1,2,4-butanetricarboxylic acid solution (Bayhibit AM, mass fraction 50%, Lanxess AG) were admixed with 29.55 g of NaOH. This gave a solution having a pH of 2.5. This solution was admixed with 2562.96 g of $H_2O$ and stirred. Subsequently, with stirring, 2000 g of ZnO (Microsun Zinc Oxide P99/30, Micronisers Pty Ltd) were added. The resulting suspension was milled in an agitated ball mill (Drais PML-H/V) with zirconium oxide grinding beads (YZT, Tosoh) having a diameter between 0.3-0.4 mm, in a continuous circulation for 615 minutes. This gave a zinc oxide dispersion which possesses an average particle diameter ($d_{50}$) of 52 nm and a $d_{90}$ value (volume distribution) in the particle size distribution of 93 nm. The dispersion had a shelflife of several months.

EXAMPLE 2

369.02 g of a 2-phosphono-1,2,4-butanetricarboxylic acid solution (Bayhibit AM, mass fraction 50%, Lanxess AG)

were admixed with 163.37 g of the tetrasodium salt of 2-phosphono-1,2,4-butanetricarboxylic acid (Bayhibit S, Lanxess AG). Thereafter, 4922 g of $H_2O$ were added and the mixture was stirred until a solution was formed. Subsequently, with stirring, 5000 g of ZnO (Microsun Zinc Oxide P99/30, Micronisers Pty Ltd) were added. The resulting suspension was milled in an agitated ballmill (Drais PML-H/V) with zirconium oxide grinding beads (YZT, Tosoh) having a diameter between 0.3-0.4 mm, in a continuous circulation for 1035 minutes. This gave a zinc oxide dispersion which possesses an average particle diameter ($d_{50}$) of 47 nm and a $d_{90}$ value (volume distribution) in the particle size distribution of 88 nm. The dispersion had a shelflife of several months.

EXAMPLE 3

125.05 g of a 2-phosphono-1,2,4-butanetricarboxylic acid solution (Bayhibit AM, mass fraction 50%, Lanxess AG) were admixed with 12.65 g of KOH. Thereafter, 1216 g of $H_2O$ were added and the mixture was stirred until a solution was formed. Subsequently, with stirring, 1250 g of ZnO (Microsun Zinc Oxide P99/30, Micronisers Pty Ltd) were added. The resulting suspension was milled in an agitated ballmill (Drais PML-H/V) with zirconium oxide grinding beads (YZT, Tosoh) having a diameter between 0.3-0.4 mm, in a continuous circulation for 250 minutes. This gave a zinc oxide dispersion which possesses an average particle diameter ($d_{50}$) of 56 nm and a $d_{90}$ value (volume distribution) in the particle size distribution of 100 nm. The dispersion had a shelflife of several months.

EXAMPLE 4

246 g of a 2-phosphono-1,2,4-butanetricarboxylic acid solution (Bayhibit AM, mass fraction 50%, Lanxess AG) were admixed with 18.11 g of NaOH. This gave a solution having a pH of 2.5. This solution was admixed with 2230 g of $H_2O$ and stirred. Subsequently, with stirring, 2500 g of ZnO (Microsun Zinc Oxide P99/30, Micronisers Pty Ltd) were added. The resulting suspension was milled in an agitated ballmill (Drais PML-H/V) with zirconium oxide grinding beads (YZT, Tosoh) having a diameter between 0.3-0.4 mm, in a continuous circulation for 600 minutes. The dispersion was subsequently ground in an agitated ballmill (MicroMedia MMP1, Bühler AG) with zirconium oxide grinding beads (YZT, Tosoh) having a diameter between 0.1-0.2 mm in a continuous circulation for 100 minutes. This gave a zinc oxide dispersion which possesses an average particle diameter ($d_{50}$) of 46 nm and a $d_{90}$ value (volume distribution) in the particle size distribution of 76 nm. After storage of the dispersion at 40° C. for 9 months, the $d_{50}$ altered to 48 nm and the $d_{90}$ value to 80 nm, which is within the bounds of measurement accuracy. At 70° C. over the course of three months, the particle size distribution altered to a $d_{90}$ value of 107 nm.

EXAMPLE 5

For example 5, mixtures of additives and an acrylate-based paint formulation (see table 1) were produced, giving a total of 0.9% by weight of ZnO additive in the dry coat (see table 2 and table 3). The ZnO dispersion used was the phosphonocarboxylic acid-modified ZnO dispersion of example 1, and it possessed a solids content of 40%. The paints under investigation were applied in one instance with a wet film thickness of 400 µm to polymeric films (Leneta® films, loaded with a 2.5 kg weight), and in the other instance in three layers with a consumption of in each case about 100 g/m² to wooden specimens (three-ply boards of pine, loaded with a 7 kg weight). Testing was performed after a drying time of 2 days. The blocking test on the paints produced took place in accordance with guideline 6 "Blocking of paint systems on wooden windows" (March 1999) of the Institut für Fenstertechnik e.V., Rosenheim. For comparison, the same mixture but without ZnO additive was tested.

TABLE 1

Composition of the paint formulation 1 used without ZnO additive

| Addition step | Ingredient | Mass [g] |
|---|---|---|
| 1. | Primal AC-337 ER | 195.00 |
| 2. | Tego Foamex 825 | 0.60 |
| 3. | Water | 30.00 |
| 4. | Texanol | 6.90 |
| 5. | Ammonia solution, 25% | 0.78 |
| 6. | Water | 60.00 |
| 7. | Acrysol RM-12W | 2.01 |
| 8. | Water | 0.30 |

TABLE 2

Results for the blocking tests on polymeric film

| No. | Paint system | Additive | Additive content (mass fraction in dry coat)/% | Blocking index after moisture exposure | Blocking index after temperature exposure |
|---|---|---|---|---|---|
| 1 | 1 | ZnO | 0.9 | 1 | 1-2 |
| 2 | 1 | — | — | 2-3 | 5 |

TABLE 3

Results for the blocking tests on wood

| No. | Paint system | Additive | Additive content (mass fraction in dry coat)/% | Blocking index after moisture exposure | Blocking index after temperature exposure |
|---|---|---|---|---|---|
| 3 | 1 | ZnO | 0.9 | 2 | 2 |
| 4 | 1 | — | — | 5 | 5 |

The results in tables 2 and 3 show that the use of nanoscale ZnO particles in the paint under investigation improves the blocking resistance. The index for blocking resistance on polymeric film is improved after moisture exposure from 2-3 to 1 and after temperature exposure from 5 to 1-2. The results in table 3 show that the index for blocking resistance after moisture exposure and after temperature exposure improves from 5 to 2 through the use of nano-ZnO particles.

EXAMPLE 6

Mixtures of additives and an acrylate-based paint formulation (see table 4) were produced, giving a total of 0.9% of ZnO additive in the dry coat (see table 4). The PBTC-ZnO dispersion was prepared in accordance with example 1, and it had a solids content of 40%. Also used were commercially available nanoscale ZnO dispersions (Nanobyk® 3840 from Byk (ZnO-Byk) and Zano® W-084 from Umicore (Zano W-084)) at the same concentration. As a comparison, the same paint formulation but without ZnO dispersion was tested.

The polymer dispersions with the additives added were homogenized and knife-coated onto glass plates to give a wet film thickness of 100 μm. The wet films were dried at room temperature. The drying time to drying level 4 was determined in accordance with DIN 53150. The drying time to drying level 4 (see table 4) is reduced through the use of ZnO from more than 48 hours to 20 hours.

TABLE 4

Results of the measurement of the drying time

| No. | Paint system | Additive | Additive content (mass fraction in dry coat)/% | Drying time to drying level 4/h |
|---|---|---|---|---|
| 5 | 1 | ZnO-PBTC | 0.9 | 20 h |
| 6 | 1 | ZnO-Byk | 0.9 | 20 h |
| 7 | 1 | Zano W-084 | 0.9 | 20 h |
| 8 | 1 | — | — | >48 h |

EXAMPLE 7

222.47 g of a 2-phosphono-1,2,4-butanetricarboxylic acid solution (Bayhibit AM, mass fraction 50%, Lanxess AG) were admixed with 22.03 g of the tetrasodium salt of 2-phosphono-1,2,4-butanetricarboxylic acid (Bayhibit S, Lanxess AG), 34.10 g of triethanolamine, and 2.50 g of sodium hydroxide. Thereafter, 3147.4 g of $H_2O$ were added and stirring was continued until a solution was formed. Subsequently, with stirring, 2571 g of ZnO (Zano 30, Umicore) were added. The resulting suspension was milled in an agitated ballmill (Drais PML-H/V) with zirconium oxide grinding beads (YZT, Tosoh) having a diameter between 0.3-0.4 mm, in a continuous circulation for 280 minutes. The dispersion was subsequently ground in an agitated ballmill (MicroMedia MMP1, Bühler AG) with zirconium oxide grinding beads (YZT, Tosoh) having a diameter between 0.1-0.2 mm in a continuous circulation for 90 minutes. This gave a zinc oxide dispersion which possesses an average particle diameter ($d_{50}$) of 49 nm and a $d_{90}$ value (volume distribution) in the particle size distribution of 89 nm.

EXAMPLE 8

4300 g of $H_2O$ were admixed with 625.34 g of a 2-phosphono-1,2,4-butanetricarboxylic acid solution (Bayhibit AM, mass fraction 50%, Lanxess AG) and 46.41 g of sodium hydroxide. Thereafter, stirring took place until a solution was formed. Subsequently, with stirring, 5000 g of ZnO (Activox R 50, Rockwood Pigments UK, Durham) were added. The resulting suspension was subjected to preliminary grinding in an agitated ballmill (Drais PML-H/V) with zirconium oxide grinding beads (YZT, Tosoh) having a diameter between 0.3-0.4 mm in a continuous circulation for 47 minutes. Thereafter the dispersion was ground in an agitated ballmill (MicroMedia MMP1, Bühler AG) with zirconium oxide grinding beads (YZT, Tosoh) having a diameter between 0.1-0.2 mm in a continuous circulation for 265 minutes. This gave a zinc oxide dispersion which possesses an average particle diameter ($d_{50}$) of 64 nm and a $d_{90}$ value (volume distribution) in the particle size distribution of 98 nm.

EXAMPLE 9

1300 g of $H_2O$ were admixed with 100.17 g of a 2-phosphono-1,2,4-butanetricarboxylic acid solution (Bayhibit AM, mass fraction 50%, Lanxess AG) and 67.71 g of a 25% strength tetramethylammonium hydroxide solution. Subsequently, with stirring, 1000 g of ZnO (Zano 30, Umicore) were added. The resulting suspension was subjected to grinding in an agitated ballmill (Drais PML-H/V) with zirconium oxide grinding beads (YZT, Tosoh) having a diameter between 0.3-0.4 mm in a continuous circulation for 360 minutes. This gave a zinc oxide dispersion which possesses an average particle diameter ($d_{50}$) of 56 nm and a $d_{90}$ value (volume distribution) in the particle size distribution of 112 nm.

EXAMPLE 10

1000 g of $H_2O$ were admixed with 36 g of phosphonoacetic acid (Sigma-Aldrich) and 8.08 g of sodium hydroxide. Subsequently, with stirring, 1000 g of ZnO (Zano 30, Umicore) were added. The resulting suspension was subjected to grinding in an agitated ballmill (Drais PML-H/V) with zirconium oxide grinding beads (YZT, Tosoh) having a diameter between 0.3-0.4 mm in a continuous circulation for 160 minutes. This gave a zinc oxide dispersion which possesses an average particle diameter ($d_{50}$) of 70 nm and a $d_{90}$ value (volume distribution) in the particle size distribution of 166 nm.

EXAMPLE 11

For the measurement of the UV/Vis transmittance, mixtures of an acrylate binder and different ZnO dispersions were prepared. For this purpose, the surface-modified ZnO dispersion of example 2 and commercially available nanoscale ZnO dispersions (Nanobyk® 3840 and Zano W-084) were used. As a physically curing acrylate system, a mixture of 200.3 g of Revertex® LS 1032-1 binder and 12.8 g of Texanol was used. The ZnO dispersions were mixed with the binder/Texanol mixture in the proportion indicated in table 5, and the mixtures were applied with a doctor blade to glass plates and dried at room temperature. Coats with an average thickness of around 55 μm were obtained. The transmittance was measured in a UV/Vis spectrometer (UV-2401PC, Shimadzu), against a comparison sample which contained no zinc oxide, in the wavelength range of 350-800 nm.

TABLE 5

Composition of the coats investigated.

| ZnO | Amount of acrylate binder (g) | Amount of ZnO dispersion (g) | Amount of acrylate in dry film (%) | Amount of ZnO in dry film (%) | 98% transmittance achieved at (nm) |
|---|---|---|---|---|---|
| as per example 2 | 20.0 | 0.36 | 98.2 | 1.8 | 589 |
| Zano W-084 | 20.0 | 0.35 | 98.2 | 1.8 | 619 |
| Nanobyk 3840 | 20.0 | 0.43 | 98.2 | 1.8 | less than 98% in the wavelength range under investigation |

Here it was found that, with the surface-modified ZnO of example 2 in accordance with the invention, a 98% transmittance was achieved at a wavelength of 589 nm. In comparison it was found that the sample with Zano W-084 achieves a 98% transmittance only at a wavelength of 619 nm. The comparison sample with Nanobyk 3840 did not exhibit transmittance of more than 98% at all within the wavelength range under investigation.

EXAMPLE 12

Mixtures of additives and Revertex LS-1032-1 (acrylate polymer dispersion in water) were prepared, giving the dry coat a total inorganic additives content of 1% (see table 6). As a flow control additive, 6% (m/m, based on the polymer dispersion) of Texanol were added to the dispersion prepared. The solids content of the $SiO_2$ dispersion (Levasil 300/30) was 30%; the ZnO dispersion (prepared from ZnO from Microsun, Zinc Oxide P99/30) possessed a solids content of 46%.

The polymer dispersions with the additives added were homogenized and knife-coated onto glass plates, giving a wet film thickness of 100 μm. The wet films were dried at 70° C. for 30 minutes. The films thus produced on the glass plates were subjected to an MEK resistance test in accordance with EN 13523-11. Table 6 includes the number of double rubs after which the coat on the glass plate was destroyed right through.

TABLE 6

Composition of the paint samples for example 12

| Paint system | Additive | Additive content (mass in dry coat)/% | Number of double MEK rubs |
|---|---|---|---|
| Revertex LS-1032-1 | ZnO | 1 | 68 |
| Revertex LS-1032-1 | $SiO_2$ | 1 | 39 |
| Revertex LS-1032-1 | — | — | 27 |

EXAMPLE 13

Mixtures of additives and an acrylate-based paint formulation were prepared, giving the dry coat a total additives content of 0.9%. The solids content of the $SiO_2$ dispersion (prepared from Aerosil® 8200) was 15%; the ZnO dispersion (prepared from ZnO from Microsun, Zinc Oxide P99/30) possessed a solids content of 40%.

As an organic comparative additive, Aquacer® 535 (Byk®) was used, which is likewise used for improving the surface properties. The polymer dispersions with the additives added were homogenized and knife-coated onto glass plates, giving a wet film thickness of 100 μm. The wet films were dried at room temperature. The films produced with the aqueous dispersion on the glass plate were subjected to an MEK resistance test in accordance with EN 13523-11. Table 8 includes the number of double rubs after which the coat on the glass plate was destroyed right through.

TABLE 7

Composition of the paint formulation "HBST337" used

| Addition step | Ingredient | Amount/g |
|---|---|---|
| 1 | Primal AC-337 ER | 195.00 |
| 2 | Tego Foamex 825 | 0.60 |
| 3 | Water | 30.00 |
| 4 | Texanol | 6.90 |
| 5 | Ammonia solution, 25% | 0.78 |
| 6 | Water | 60.00 |
| 7 | Acrysol RM-12W | 2.01 |
| 8 | Water | 0.30 |

TABLE 8

Composition of the paint for example 13

| Paint system | Additive | Additive content* | Number of double MEK rubs |
|---|---|---|---|
| HBST337 | Aquacer 535 | 0.9 | 34 |
| HBST337 | — | — | 43 |
| HBST337 | ZnO | 0.9 | 107 |
| HBST337 | $SiO_2$ | 0.9 | 57 |

*(Mass in dry coat)/%

What is claimed is:

1. A method of reducing the drying time and/or increasing the blocking resistance and/or increasing the resistance against chemicals, detergents, heat, weathering and/or biological assault of a dried and/or cured aqueous binder system, wherein the method comprises combining the aqueous binder system with nanoscale ZnO particles comprising nanoscale ZnO particles which have been surface-modified with at least one of a phosphonocarboxylic acid and a salt thereof.

2. The method of claim 1, wherein the nanoscale ZnO particles are added to the aqueous binder system as a powder.

3. The method of claim 1, wherein the nanoscale ZnO particles are added to the aqueous binder system as a dispersion.

4. The method of claim 3, wherein the dispersion comprises an aqueous dispersion.

5. The method of claim 1, wherein the binder system is a coating composition.

6. The method of claim 1, wherein the drying time of the binder system is shortened.

7. The method of claim 1, wherein the blocking resistance of the dried and/or cured binder system is increased.

8. The method of claim 1, wherein the resistance against chemicals, detergents, heat, weathering and/or biological assault of the dried and/or cured binder system is increased.

9. Surface-modified nanoscale zinc oxide particles, wherein the zinc oxide particles are surface-modified with a mixture of 2-phosphono-1,2,4-butanetricarboxylic acid and one or more salts of 2-phosphono-1,2,4-butanetricarboxylic acid with monovalent cations ($M^+$), a molar ratio of $M^+$ to 2-phosphono-1,2,4-butanetricarboxylic acid and salt(s) thereof being from 0.1:1 to 3:1.

10. The surface-modified nanoscale zinc oxide particles of claim 9, wherein the particles are present as a powder.

11. The surface-modified nanoscale zinc oxide particles of claim 9, wherein the particles are present as an aqueous dispersion.

12. The surface-modified nanoscale zinc oxide particles of claim 9, wherein the salt of the phosphonocarboxylic acid comprises at least one of an alkali metal salt and an ammonium salt.

13. A process for preparing the surface-modified nanoscale ZnO particles of claim 9, wherein the process comprises subjecting ZnO particles in a liquid medium to a dispersing treatment in the presence of a mixture of 2-phosphono-1,2,4- butanetricarboxylic acid and one or more salts of 2-phosphono-1,2,4-butanetricarboxylic acid with monovalent cations ($M^+$), a molar ratio of $M^+$ to 2-phosphono-1,2,4-butanetricarboxylic acid and salt(s) thereof being from 0.1:1 to 3:1.

14. A UV protection agent, catalyst, activator for vulcanization, component for producing optical systems or electronic components and/or agent for modifying optical or electronic properties of moldings, coatings or bulk materials, wherein the agent, catalyst or component comprises the surface-modified nanoscale ZnO particles of claim 9.

15. The surface-modified nanoscale zinc oxide particles of claim 9, wherein from 0.05 to 1 mmol of 2-phosphono-1,2,4-butanetricarboxylic acid and salt thereof per g of zinc oxide are present.

16. The surface-modified nanoscale zinc oxide particles of claim 9, wherein the molar ratio of $M^+$ to 2-phosphono-1,2,4-butanetricarboxylic acid and salt(s) thereof is from 0.1:1 to 1.8:1.

17. An aqueous coating composition, wherein the coating composition comprises as an additive nanoscale ZnO particles comprising nanoscale ZnO particles which have been surface-modified with at least one of a phosphonocarboxylic acid and a salt thereof.

18. The coating composition of claim 17, wherein the least one of a phosphonocarboxylic acid and a salt thereof comprises at least one of 2-phosphono-1,2,4-butanetricarboxylic acid and a salt thereof.

19. An aqueous coating composition, wherein the coating composition comprises as an additive the surface-modified nanoscale zinc oxide particles of claim 9.

20. The method of claim 1, wherein the nanoscale ZnO particles comprise nanoscale ZnO particles which have been surface-modified with a mixture of 2-phosphono-1,2,4-butanetricarboxylic acid and one or more salts of 2-phosphono-1,2,4-butanetricarboxylic acid with monovalent cations ($M^+$), a molar ratio of $M^+$ to 2-phosphono-1,2,4-butanetricarboxylic acid and salt(s) thereof being from 0.1:1 to 3:1.

* * * * *